United States Patent Office 3,346,252
Patented Oct. 10, 1967

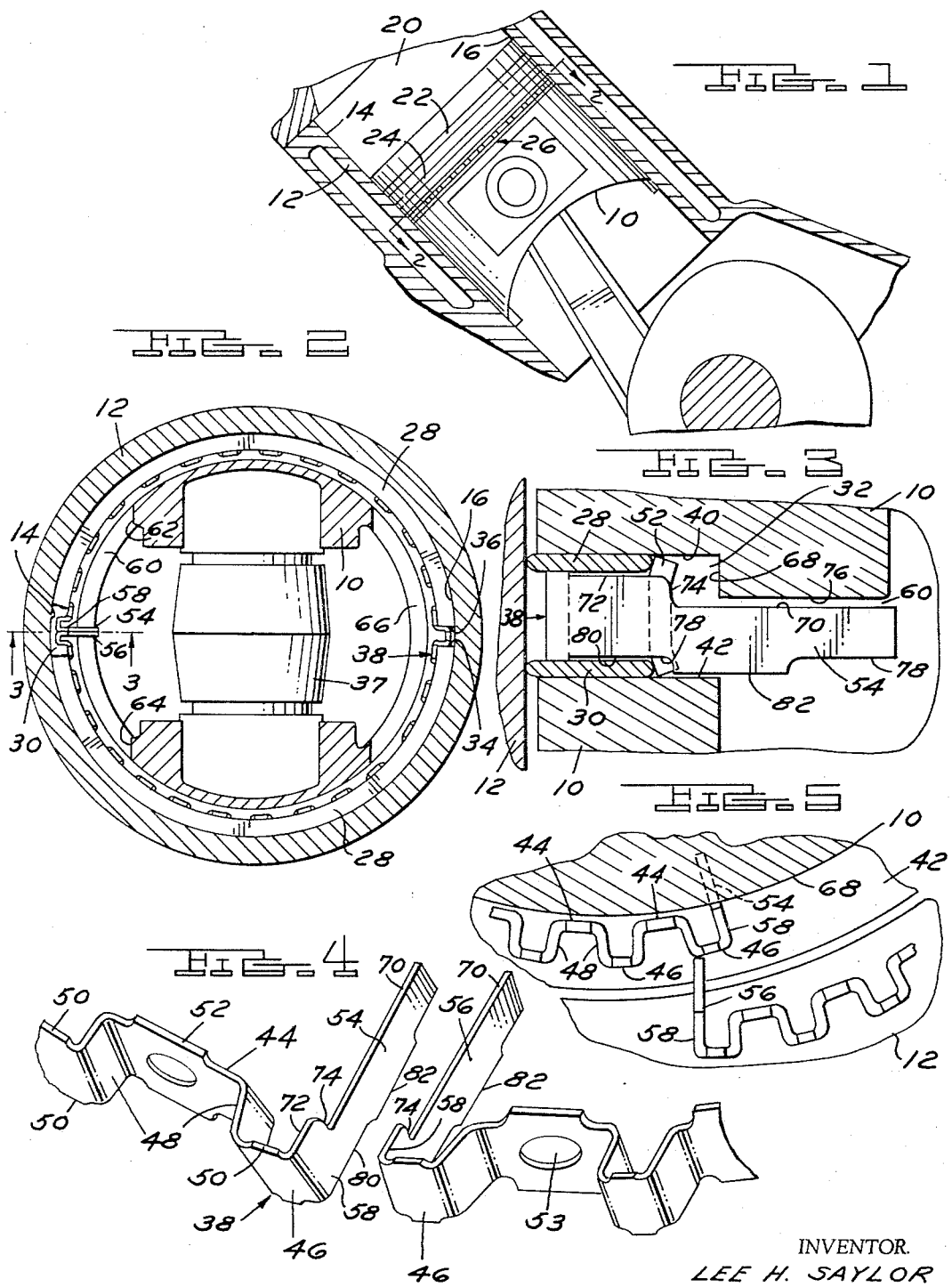

3,346,252
NARROW WIDTH PISTON RING AND
EXPANDER-SPACER
Lee H. Saylor, Muskegon, Mich., assignor to Sealed
Power Corporation, Muskegon, Mich., a corporation of Michigan
Filed June 17, 1963, Ser. No. 288,293
3 Claims. (Cl. 267—1.5)

This invention relates to pistons and piston rings, and more particularly to a piston and oil ring assembly for use in cylinders having one side subjected to greater oil accumulation than the opposite side, the ring being initially oriented with its parting gap or gaps at the opposite side of the cylinder and being adapted to remain so oriented during operation of the engine to thereby reduce oil consumption, smoking and spark plug fouling.

The oil ring of the present invention employs one or more split rails in combination with an expander-spacer of the non-bottoming circumferential abutment type which co-operates with the piston to prevent or limit rotation of the rail or rails relative to the piston, which facilitates installation of the ring in the ring groove of the piston and which preferably has a cleaning action in an oil drainage opening in the piston.

An object of the present invention is to provide an oil ring assembly of the above character which is adapted to fit in a piston oil ring groove of relatively narrow axial width and/or in a groove with an oil drainage opening axially offset from the centerline of the groove.

Another object is to provide an improved expander-spacer which co-operates with one or more rails to provide a relatively narrow width composite oil ring of the above character, which is economical to construct and which is provided with an anti-rotation projection without reducing the strength of the expander-spacer.

Other objects, advantages and features of the present invention will become apparent from the following description taken in connection with the accompanying drawing in which:

FIG. 1 is a fragmentary vertical section of an engine cylinder oriented with its axis at an angle to the vertical, with a piston and oil ring assembly of the invention disposed therein and shown in elevation.

FIG. 2 is an enlarged sectional view taken on the line 2—2 of FIG. 1 illustrating the oil ring assembly of the invention in plan view with a portion broken away to illustrate detail.

FIG. 3 is a further enlarged sectional view taken on the line 3—3 of FIG. 2.

FIG. 4 is an enlarged fragmentary perspective view of the normally abutting ends of an expander-spacer of the present invention, the ends being shown parted.

FIG. 5 is a fragmentary horizontal section through the piston at the ring groove, reduced in scale from FIG. 4, with the rails omitted to illustrate how the ends of the expander-spacer prevent assembly of the piston in the cylinder when the ends are in a radially misaligned, overlapped condition.

Referring to FIG. 1, a piston 10 is shown in operative position in engine cylinder 12 which is oriented with its axis at an angle to the vertical. Due to the inclination of cylinder 12, the lubricating oil supplied to the cylinder wall tends to gravitate to the lowermost side 14 thereof during engine operation, the wall area 16 of highest elevation in the cylinder being least subject to oil accumulation. Piston 10 is equipped with conventional upper and middle compression rings 22 and 24, and with an oil ring assembly 26 of the present invention which limits flow of oil upwardly along the cylinder wall towards the combustion chamber 20.

As shown in FIGS. 2 and 3, oil ring 26 comprises a pair of thin flat steel rails 28 and 30 which are split to permit them to be slipped over the head of the piston for insertion in the oil ring groove 32 of piston 10. As is customary, when rails 28 and 30 are compressed radially to operating diameter within the cylinder, a gap remains between the parted ends 34 and 36 of each rail (FIG. 2). Although the piston cannot rotate due to its connection to wrist pin 37, the rails normally do tend to rotate relative to the piston during engine operation, and therefore the parting gaps may well end up on the low side 14 of the cylinder, resulting in loss of oil control by the oil ring. To overcome this problem, oil ring assembly 26 includes an expander-spacer 38 which not only spaces rails 28 and 30 axially apart into sealing relation with the top and bottom walls 40 and 42 respectively of groove 32 and biases the rails radially outward into scraping contact with cylinder 12, but also limits rotation of the rails relative to the piston to thereby maintain the parting gap of the rails adjacent the "dry" side 16 of the cylinder.

Expander-spacer 38 preferably is an annular, radially corrugated ribbon of stainless steel which, like the rails, is split to permit installation over the piston. Unlike the rails, the parted ends 58 of expander-spacer 38 are normally disposed in circumferentially abutting relation with one another as shown in FIG. 2 when the ring assembly is compressed to operating diameter in the cylinder so that it is self-supporting, e.g., radial expanding forces are developed in the expander-spacer without receiving support from the back wall 68 of groove 32.

As best seen in FIGS. 4 and 5, expander-spacer 38 is radially corrugated intermediate its ends into an alternating series of inner and outer crowns 44 and 46 which extend generally circumferentially and are interconnected by radially diverging integral legs 48. Axially projecting pads 50 at the upper and lower edges of outer crowns 46 space rails 28 and 30 axially apart near their outer periphery, and inwardly inclined lips 52 extending from the upper and lower edges of inner crowns 44 bear against the inner peripheries of the rails to force them both axially apart and radially outwardly. Oil drainage openings 53 are provided in inner crowns 44 (FIG. 4).

With this type of expander-spacer, it has been found that rails 28 and 30 do not normally rotate relative to the expander-spacer during engine operation, but unless restrained the entire ring assembly consisting of rails 28 and 30 and expander-spacer 38 will rotate as a unit relative to the piston in response to piston reciprocation. However, in accordance with the present invention such rotation is limited by the provision of at least one but preferably two fingers 54 and 56 which project radially inwardly from the parted ends 58 of expander-spacer 38. Fingers 54, 56 are integral with and form a continuation of the endmost legs 58 of the expander-spacer. Fingers 54 and 56 extend radially inwardly beyond the innermost diameter of expander-spacer 38 a distance sufficient to project into the oil drainage slot or opening 60 provided in the piston. Upon rotation of the ring, fingers 54, 56 can move in oil drainage slot 60 but only within the limits set by the end walls 62 and 64 of the slot. Hence rotation of expander-spacer 38 is limited to the circumferential dimension of the oil drainage opening. Therefore, once ring assembly 26 has been properly installed with ends 34 and 36 of the rails initially adjacent the high side 16 of the cylinder, the parting gap of each rail will remain adjacent the high side since rotation of the rails is likewise confined within the limits set by the confinement of fingers 54 and 56 between end walls 62 and 64 of the drainage slot.

It is to be understood that fingers 54, 56 may likewise operate in the oil drainage slot 66 located on the opposite side of the piston from slot 60, or in some other oil drainage opening in a piston having a different oil ventilation arrangement from that illustrated herein. However, the movement of fingers 54 and 56 circumferentially back and forth in the oil slot provides a cleaning action by wiping carbon deposits from the slot. Therefore it is advantageous to locate the fingers in whichever slot is most prone to clogging, normally slot 60 adjacent the lower side 14 of the cylinder.

As illustrated in FIGS. 2 and 5, fingers 54 and 56 also serve as anti-overlap stops for one another and thus reduce the possibility of the ends of expander-spacer 38 becoming overlapped due to radial misalignment during assembly and installation of the oil ring on the piston. The fingers more than double the effective radial dimension of the end abutments 58 of the expander-spacer. Hence, as illustrated in FIG. 5, one end 58 must shift radially outwardly until it is out of groove 32 before finger 56 can overlap the outer crown 46 adjacent the other end 58 of expander-spacer 38. The overlapping end still projects even when hooked into the corrugation formed by an inner crown 44 and a pair of legs 48. Should either of these conditions occur, it will be impossible to compress oil ring assembly 26 to operating diameter. Instead, the overlapping end 58 associated with finger 56 will overlie the upper end of the cylinder 12 (as shown in FIG. 5) so that it will block insertion of the piston in the cylinder and thereby immediately indicate to the assembler that the oil ring has been improperly installed. Otherwise, installation of the piston could proceed without detecting the overlapped condition and excessive oil consumption due to loss of oil control by the ring would result, requiring an expensive removal of the piston to correct this condition.

In addition to the aforementioned anti-rotation, anti-clogging and anti-overlap features, oil ring assembly 26 in accordance with the present invention fits within an oil groove of a piston of relatively narrow axial width. "Narrow" as used herein means a groove in which the dimension measured between the top and bottom walls 40 and 42 of groove 32 and parallel to the piston axis is on the order of ⅛ of an inch, but less than the axial widths of the larger grooves more commonly provided for oil rings, such as 3/16, ¼ and 5/32 inch. Because of the reduced axial width of expander-spacer 38 (about .125 inch or less) required to fit the narrow groove, if fingers 54, 56 or other projections were struck out from the crowns 44 or 46 too little material would be left in the crown for adequate strength, or the axial width of the projection would be too narrow for adequate strength at the point where it would unite with the crown. However, by forming fingers 54 and 56 as integral extensions of the endmost legs 58 of the expander-spacer, the expander-spacer is not weakened in order to provide the keying projections.

The problem presented by a narrow width oil groove is further aggravated by the axially offset oil drainage slot 60 which opens into the back wall 68 of groove 32 in the lower half of the back wall (FIG. 3). This axial offset of oil slot 60 relative to groove 32 requires that fingers 54, 56 likewise be axially offset. But if the fingers were struck out from the inner or outer crowns, they would have to be struck from the material adjacent one longitudinal edge of the expander-spacer. This in turn would unbalance the connecting portion of the crown and upset the balanced relation between the expander-spacer and the top and bottom rails 28 and 30. The present invention also overcomes this problem by forming each finger 54, 56 as an integral extension of the parted ends 58 of expander-spacer 38.

The upper edge 70 of each finger 54, 56 is formed by blanking or milling off the upper edges 72 of the end legs 58 to form a shoulder 74 (FIGS. 3 and 4) at right angles to the upper edges 70 and 72, edge 70 extending radially inwardly from shoulder 74 beneath the overlying wall 76 of oil slot 60. The lower edge of each finger 54, 56 extends radially inwardly flush with the lower edge 80 of end leg 58 and then curves downwardly at 78 (FIG. 3) where it joins a pad 82. Pad 82 does not normally contact bottom wall 42 of groove 32. By so connecting fingers 54 and 56 with legs 58, each finger has an axial width which is at least half that of leg 58 at the point where they are integrally joined, and hence a joint of adequate strength is provided without weakening the expander-spacer. The axial offset of oil slot 60 is thus accommodated by a projection which, although axially offset, does not unbalance the spring action of the expander-spacer.

From the foregoing description it will now be understood that the present invention provides an improved expander-spacer which co-operates with one or more split rails and with a piston having a narrow width oil groove and/or an axially offset oil ventilation arrangement, to provide an economical solution to the problem of oil control in a non-vertical cylinder.

I claim:

1. An expander-spacer for a narrow axial width oil ring assembly comprising a generally circular, parted resilient member having circumferentially abutting ends when said expander-spacer is compressed to operating diameter and radial corrugations intemediate said ends, said corrugations comprising an alternating series of generally circumferentially extending inner and outer crowns and generally radial flexing portions interconnecting said crowns, said inner crowns each having a centrally disposed oil drainage hole therethrough, said corrugations except for said holes being imperforate, said outer crowns and said radial flexing portions having an axial width only slightly less than the maximum axial width of said expander-spacer.

2. The article set forth in claim 1 wherein said abutting ends each comprise one of said crowns and a projection integral therewith forming a continuation and terminal end thereof and extending generally radially inwardly from said one crown beyond the radially innermost portion of said corrugations and adapted to serve as a stop for said other end when said ends are radially misaligned with one another.

3. An expander-spacer for supporting, spacing and outwardly pressing a generally flat rail in a piston ring comprising a generally circular, parted resilient member having circumferentially abutting ends when the expander-spacer is radially and circumferentially compressed to operating diameter and having radial corrugations intermediate said ends, said corrugations comprising an alternating series of generally circumferentially extending inner and outer crowns and generally radial flexing portions intermediate said crowns, each of said abutting ends of said expander-spacer consisting solely of the one of said crowns closest to the associated end of said expander-spacer and a projection integrally joined thereto and forming a continuation and terminal portion thereof, each said one crown and associated projection being imperforate, each of said projections having a straight portion extending from a point adjacent the outer diameter of said expander-spacer radially inwardly beyond the radially innermost portion of said corrugations by a distance at least equal to the radial distance between said inner and outer crowns to serve as a stop for the adjacent abutting end of said expander-spacer when said ends are radially misaligned with one another, each of said projections having an axial width at the junction thereof with said one crown at least half the axial width of said one crown, said straight portions of said projections being adapted to abut one another along their entire radial length when said ends are radially aligned with one another.

References Cited
UNITED STATES PATENTS

| | | | |
|---|---|---|---|
| 2,637,607 | 5/1953 | Olson | 277—139 X |
| 2,831,738 | 4/1958 | Marien | 277—139 |
| 3,105,695 | 10/1963 | Burns et al. | 277—79 |

SAMUEL ROTHBERG, *Primary Examiner.*

L. J. RANEY, J. S. MEDNICK, *Assistant Examiners.*